(12) United States Patent
O'Hearn et al.

(10) Patent No.: US 7,610,801 B2
(45) Date of Patent: Nov. 3, 2009

(54) FLOW DEVICE AND METHOD

(75) Inventors: Brian O'Hearn, Richmond Hill (CA); Nils Steward, The Braides (ZA)

(73) Assignee: Lafarge Canada Inc., Montreal, Quebec (CA)

( * ) Notice: Subject to any disclaimer, the term of this patent is extended or adjusted under 35 U.S.C. 154(b) by 52 days.

(21) Appl. No.: 11/059,185

(22) Filed: Feb. 16, 2005

(65) Prior Publication Data

US 2005/0262935 A1    Dec. 1, 2005

(30) Foreign Application Priority Data

May 25, 2004    (CA) .................................. 2468221

(51) Int. Cl.
*G01F 17/00* (2006.01)
(52) U.S. Cl. ...................... 73/149; 73/861; 73/861.351
(58) Field of Classification Search .................. 73/149, 73/861, 861.351; 141/331, 327
See application file for complete search history.

(56) References Cited

U.S. PATENT DOCUMENTS

| | | | | | |
|---|---|---|---|---|---|
| 1,793,197 | A | * | 2/1931 | Speicher | 239/652 |
| 1,883,017 | A | * | 10/1932 | Sholtz | 222/23 |
| 3,322,957 | A | * | 5/1967 | Scoggin | 250/573 |
| 4,098,116 | A | * | 7/1978 | Browne | 73/861 |
| 4,372,847 | A | * | 2/1983 | Lewis | 210/86 |
| 4,395,918 | A | * | 8/1983 | Wilson | 73/861 |
| 4,706,720 | A | * | 11/1987 | Pattison et al. | 141/327 |
| 4,832,238 | A | * | 5/1989 | Taylor | 222/529 |
| 4,930,356 | A | * | 6/1990 | Porges | 73/861.08 |
| 5,228,488 | A | * | 7/1993 | Fletcher | 141/331 |

FOREIGN PATENT DOCUMENTS

JP    2002114295 A * 4/2002

* cited by examiner

*Primary Examiner*—Hezron Williams
*Assistant Examiner*—Rodney T Frank
(74) *Attorney, Agent, or Firm*—Bachman & LaPointe, P.C.

(57) ABSTRACT

A method and device allows determination of the flow rate of solids material, under gravity, in an elongate vertical pipe; the device comprises a flow head chamber having an inlet end and an outlet end, an elongate tubular neck extending from the outlet end, the neck having an exit port remote from the outlet end, and the head chamber having an interior wall means converging from the inlet end to the outlet end, and the chamber being in flow communication with the elongate tubular neck such that in a vertically oriented configuration with the inlet end uppermost, the exit port lowermost and the elongate tubular neck disposed downwardly, solids material housed in the device may flow under gravity from the chamber into the elongate tubular neck towards the exit port; in one embodiment the device has plug means adapted to releasably engage the exit port to temporarily close the exit port; in another embodiment the chamber has a volume capacity for the solids material which permits the device to deliver at least twice the volume capacity of the elongate tubular neck through the neck; in the method a sample of the solids material is allowed to flow downwardly under gravity, as a smooth flow, along the elongate tube, and the volume of material in the smooth flow exiting the elongate tube, in a known time, is measured and thereby there is determined the volume of flow of the solids material per unit time.

11 Claims, 3 Drawing Sheets

FLOW DEVICE AND METHOD

BACKGROUND OF THE INVENTION i) Field of the Invention

This invention relates to a device and method for determining the flow rate of solids material, under gravity, in an elongate vertical or angled pipe.

ii) Brief Description of Prior Art

Backfill material is employed to fill subterranean excavations. Concrete is employed in the construction of above ground structures. The backfill material is fed, under gravity, but sometimes under pressure, through an elongate vertical or angled pipe extending from the surface to the subterranean excavation. Concrete for above ground structures is fed in a similar manner through the same class of pipe. Such pipes are of significant length and problems arise if the backfill material or concrete does not flow freely through the pipe into the excavation or desired site.

Many industrial and commercial operations include procedures in which a solids material, the composition of which may vary or be varied, is manipulated or is to flow from one location to another, within an assembly site.

Backfill material and concrete are examples of such solids materials. Such solids are in particular mixtures of particulate solids or particulate solids and liquids, the flow of which will vary with change in composition or relative amounts of the ingredients of the mixture. Such solids material includes so-called Bingham material.

SUMMARY OF THE INVENTION

It is an object of the present invention seeks to provide a device and method which assesses the ability of such solids material, for example backfill material or concrete, to flow through a pipe.

It is a particular object of the invention seeks to provide a device and method for determining the rate of flow of such solids material through a pipe.

In accordance with one aspect of the invention, there is provided a device for determining the flow rate of solids material, under gravity, in an elongate pipe comprising:

a flow head chamber having an inlet end and an outlet end, an elongate tubular neck extending from said outlet end, said neck having an exit port remote from said outlet end, said head chamber having an interior wall means converging from said inlet end to said outlet end, and said chamber being in flow communication with said elongate tubular neck such that in a vertically oriented configuration with said inlet end uppermost, said exit port lowermost and said elongate tubular neck disposed downwardly, solids material housed in said device may flow under gravity from said chamber into said tubular neck towards said exit port.

In one particular embodiment of the invention, the device includes plug means adapted to releaseably engage the exit port to temporarily close the exit port.

In one embodiment, the elongate tubular neck is disposed vertically downwardly when the device is in a vertically oriented configuration with the inlet end uppermost and the exit port lowermost.

In another embodiment, the elongate tubular neck extends downwardly at an angle to the vertical when the device is in the vertically oriented configuration with the inlet end uppermost and the exit port lowermost. Typically, this angle is an acute angle, suitably not more than 40°, preferably not more than 30° and more preferably not more than 15° to the vertical. Most preferably, the angle is an acute angle.

In another particular embodiment of the invention, the chamber has a volume capacity for said solids material which permits the device to deliver at least twice the volume capacity of said elongate tubular neck through said neck. In general, the chamber should have a volume capacity which is at least twice the volume capacity of the elongated tubular neck, so as to ensure that the device delivers a sufficient smooth flow of solids material through the tubular neck for determination of the flow rate of the solids material.

In another aspect of the invention, there is provided a method of determining the flow rate of solids material, under gravity, in an elongate pipe comprising:

allowing a sample of the solids material to flow, vertically downwardly under gravity, as a smooth flow, along an elongate tube, measuring the volume of material in the smooth flow exiting the elongate tube, in a known time, and determining the volume of flow of the particulate material per unit time.

In particular, the method may be carried out with a device of the invention.

DETAILED DESCRIPTION OF INVENTION

In the device of the invention, the chamber interior wall is suitably conical forming, in use, an inverted conical funnel. The device enables measurement of the flow rate of solids material, for example backfill material or concrete running through it. It permits a bench scale test to characterize solids material flow through a pipe system.

Backfill typically consists of mine tailing and/or natural aggregate ranging from clay to gravel sized particles, mixed with water and a binder material or blend of binder materials such as Portland cement. The pulp density of the backfill material can range from 60% to 80% solids.

Concrete typically consists of coarse and fine aggregate, binder and water and has a pulp density greater than 85%.

The solids material may be considered a particulate material inasmuch as even when it has a liquid component such as water, as in the case of backfill material and concrete, it is still primarily comprised of particles. Thus, the solids material may range from a true dry particulate material to a paste-like material, including Bingham material. The prime advantage of the invention is its application to materials which are mixtures, the flow rate of which varies with modification of the relative amounts of the ingredients of the mixture, or of other parameters such as the particle sizes and viscosity of any liquid phase or ingredients of the mixture.

BRIEF DESCRIPTION OF THE DRAWING

The invention is illustrated by reference to the drawings in which.

DETAILED DESCRIPTION WITH REFERENCE TO THE DRAWING

Figure 1:
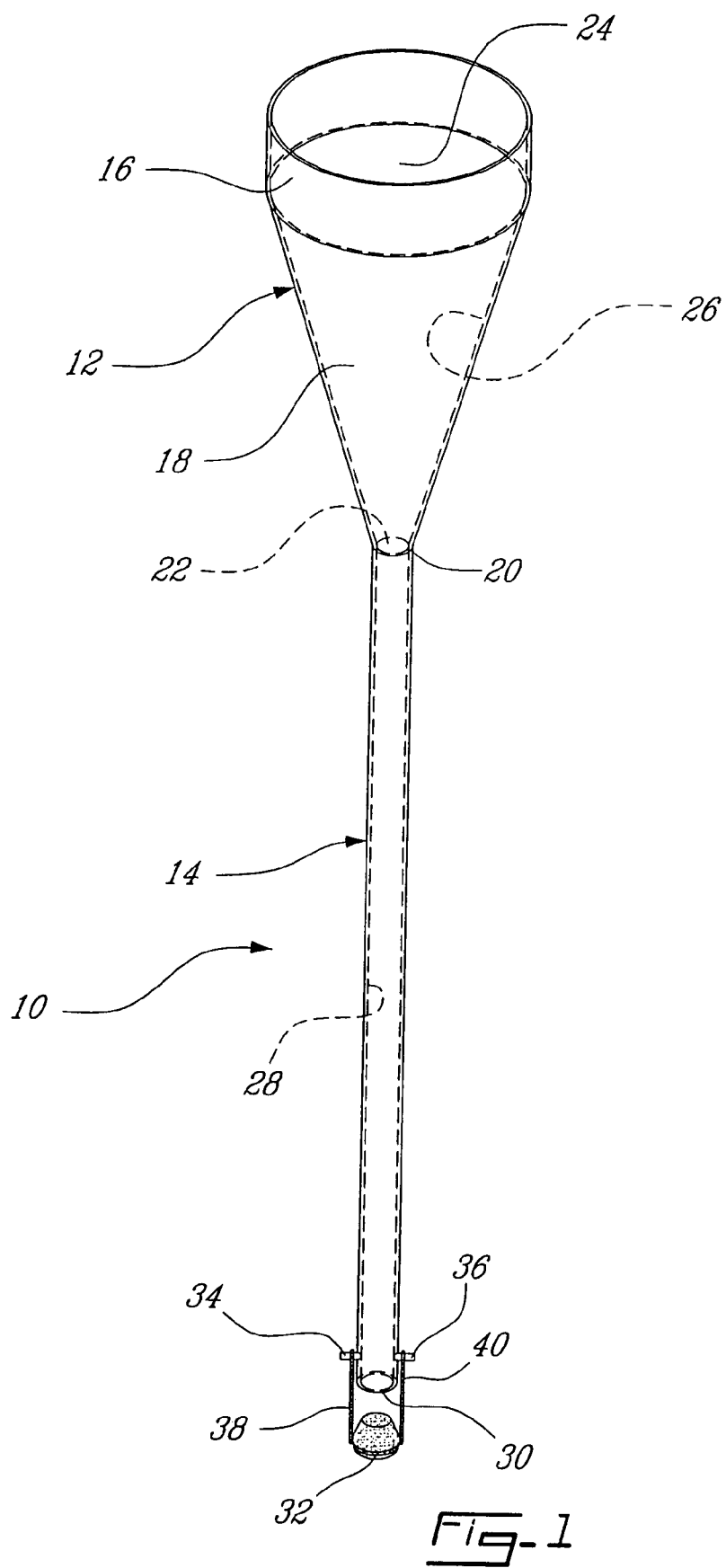
FIG. 1 illustrates schematically a device of the invention.

With further reference to FIG. 1, a device 10 of the invention has a funnel 12 and an elongate tubular stem 14.

Funnel 12 has a cylindrical inlet end 16 and a generally conical body 18 terminating at an outlet end 20 having an outlet 22, a flow chamber 24 defined by an interior wall 26 extends between inlet end 16 and outlet end 20.

Stem 14 extends from outlet end 20 of funnel 12, and has an elongate flow passage 28 in flow communication with flow chamber 24 at outlet 22. Outlet 22 forms the inlet port of flow passage 28. Stem 14 has an exit port 30 remote from the outlet 22 of funnel 12.

A plug 32 is adapted to engage exit port 3 to temporarily close exit port 30 and prevent flow of particulate material therefrom. Plug 32 is suitably of rubber or elastomeric material.

A pair of ears or tabs 34 and 36 enable plug 32 to be secured in engagement with exit port 30, by means of adjustable flexible ties 38 and 40 extending between plug 32 and ears 34 and 36, respectively.

The funnel 12 and stem 14 of device 10 may suitably be of stainless steel. In order to avoid impeding flow of material in the device 10, the interior surfaces defining flow chamber 24 and flow passage 28 are desirably smooth walled, including the juncture of funnel 12 and stem 14 at outlet end 20.

Figure 2:
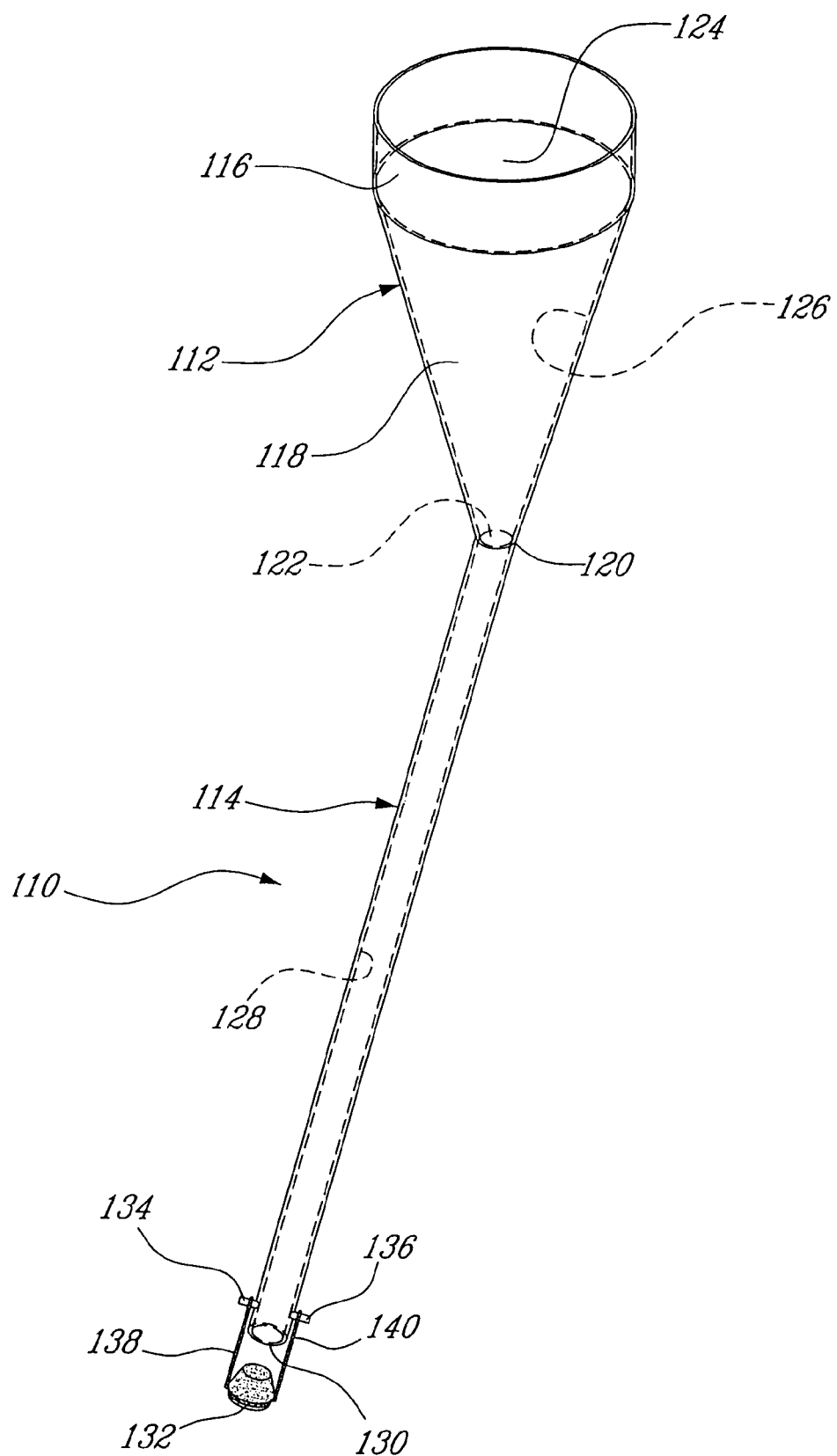
FIG. 2 illustrates the device in an alternate embodiment.

In FIG. 2 parts corresponding to those in FIG. 1 are identified by the same number but increased by 100. The device 110 in FIG. 2 differs from the device 10 of FIG. 1 only in that stem 114 in FIG. 2 is at an acute angle to the vertical when funnel 112 is upright.

Figure 3:
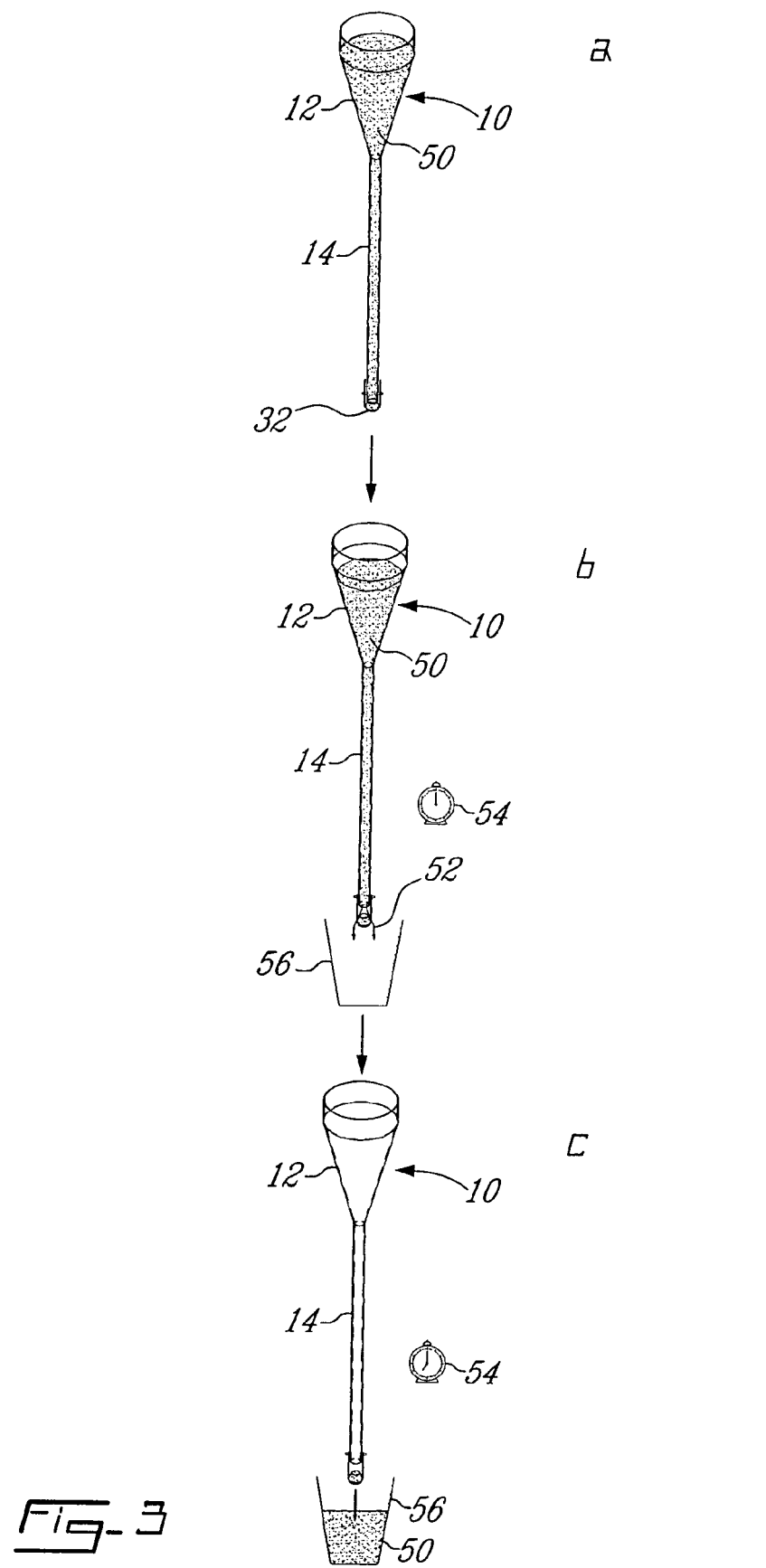
FIG. 3 illustrates schematically the method of determining the volume of flow of solids material per unit time, as a measure of flow rate, in steps labelled (a), (b) and (c)

FIG. 3 illustrates the method of determining the volume of flow of solids material per unit of time, as a measure of the flow rate.

In step (a) in FIG. 3, the device 10 of FIG. 1 is shown filled with solids material 50 with plug 32 in place.

In step (b) in FIG. 3, the plug 32 has been removed and a steady flow 52 of solids is established; the timer 54 is started and the flowing solids are collected in bucket 56.

In step (c) in FIG. 3, the flow into bucket 56 is completed and the timer is stopped.

From the volume of solids collected in bucket 56 and the time recorded by timer 54 from commencement to completion of the collection in bucket 56, the volume of flow per unit time, i.e. the flow rate, is determined.

DETAILED DESCRIPTION OF SPECIFIC EMBODIMENT OF THE DEVICE

The device 10 thus consists of three basic parts as shown in FIG. 1; the cone or funnel 12, the neck or stem 14 and the plug 32. The funnel 12 is required to hold enough material to allow the neck 14 to be filled with enough solids material, for example backfill material, to allow a volume equivalent to at least two neck lengths of material to flow through the entire length of the neck 14. The length of the neck 14 is important as the length of time the solids material, for example backfill material is in contact with the inside walls of the neck 14 is of paramount importance to the test method. When material flows through device 10, it produces different head losses at both the cone 12 and the neck 14, but because the device 10 represents flow through a pipe system, a long neck 14 is required to ensure that significant friction losses occur in the neck 14 as compared with the cone 12. The length of the neck may suitably range from 0.25 m to 4 m. The device is suitably made out of a non-corrosive material with high wear resistance such that the inside surface of the device will not change so as to affect the flow of material. The inside diameter of the neck may suitably range from 0.6 mm to 200 mm. The diameter is dependent on the size of the largest grains required to flow through the device. An important feature of device 10 is that gravity alone drives the material through it. The plug 32 at the bottom functions to hold material inside the device 10 until the operator is ready to begin the test. The plug 32 is designed to be quick releasing, like a rubber drain plug.

EXAMPLE

In a specific preferred embodiment, funnel 12 and stem 14 are of stainless steel and plug 32 is of rubber, and the device 10 has the following dimensions.
Funnel:
Height 46.6 cm
Cylindrical inlet end 16:
Inside diameter 28 cm; tubular length 7.6 cm
Conical Body 18:
Height 39 cm
Stem 14:
Length 100 cm; inside diameter 5 cm Flow Test The flow test is carried out in the following manner for backfill material:

Pour the backfill material into the device to a preset volume, indicated, for example, by a line marked on the inside of the cone 12. Line up a bucket at the bottom of the neck 14 to catch material flowing from the bottom of the device 10. Remove the plug 32 at the bottom of the device 10. Time the flow of material. Allow the material to flow for a period up to 5 seconds or until a smooth flow occurs. Restart the timer, at the time of the smooth flow. At the same time, replace the original bucket with a second bucket. Continue to time the flow until the smooth flow ends. The volume of material in the second bucket along with the measured time will give the volume of flow per unit of time. The average of two or more runs per backfill mix design is recommended to characterize each material.

The flow test for concrete is conducted in the same manner.

The invention claimed is:

1. A method of determining the flow rate of solids material, under gravity, in an elongate tube comprising:
   providing said elongate tube with an exit port at an end of said tube and a plug for closing said exit port,
   introducing a sample of said solids material into said elongate tube while said exit port is plugged,
   opening said plug and allowing said sample of the solids material to flow freely downwardly under gravity, as a smooth flow, along said elongate tube in a linear direction, in frictional engagement with said elongate tube, and exiting said elongate tube at an exit port, and
   measuring the volume of material in the smooth flow exiting the elongate tube, in a known time, and determining the volume of flow of the solids material per unit time, as a measure of the flow rate of the solids material, under gravity in an elongate pipe.

2. A method according to claim 1, wherein said elongate tube extends vertically downwardly.

3. A method according to claim 1, wherein said introducing step comprises introducing a sample of a backfill material.

4. A method according to claim 3, wherein said backfill material introducing step comprises introducing mine tailings mixed with water and binder material.

5. A method according to claim 4, wherein said backfill material introducing step further comprises introducing a backfill material comprises a natural mineral aggregate.

6. A method of determining the flow rate of solids material, under gravity, in an elongate pipe comprising:
   providing a device consisting essentially of a flow head chamber with an elongate tubular neck, said chamber having an open inlet end and an outlet end, and a chamber outlet at said outlet end, said elongate tubular neck linearly extending from said outlet end of said chamber, said neck having a terminal end, with an open exit port remote from said outlet end, and said elongate tubular neck having a linear passageway which extends from said outlet end of said chamber to said terminal end with said open exit port, said flow head chamber having an interior wall means converging from said open inlet end to said outlet end, and said chamber being in flow communication with said elongate tubular neck such that in a vertically oriented configuration with said inlet end uppermost, said open exit port lowermost and said elongate tubular neck disposed downwardly, solids material housed in said device may flow freely under gravity from said chamber into said linear elongate neck and along said linear passageway in said neck towards said open exit port, and plug means adapted to releasably engage said open exit port to temporarily close the open exit port, plugging said open exit port with said plug means, introducing a sample of said solids material into said device in an amount which is at least twice the volume of the tubular neck, removing said plug means to open said exit port, allowing a smooth flow of said solids material to flow freely under gravity in frictional engagement with said elongate tubular neck and from said open exit port, with said device in said vertically oriented configuration, and measuring the volume of material in the smooth flow exiting the open exit port in a known time, and determining the volume of flow of the solids material per unit time, as a measure of the flow rate of the solids material under gravity, in an elongate pipe.

7. A method according to claim 6, wherein the step of introducing the sample comprises filling the chamber and entirely filling the tubular neck with the sample.

8. A method according to claim 6, wherein the step of measuring the volume of material in the smooth flow exiting the elongated tube, in a known time, comprises:

starting a timer when said smooth flow is established and collecting the material exiting the elongate tube in a bucket, and timing the flow into the bucket until the smooth flow ends to provide a flow time, and determining the volume of flow per unit time from the volume in the bucket and the flow time.

9. A method of determining the flow rate of solids material, under gravity, in an elongate pipe comprising:

providing a device consisting essentially of a flow head chamber with an elongate tubular neck, said chamber having an open inlet end and an outlet end, and a chamber outlet at said outlet end, said elongate tubular neck extending from said outlet end of said chamber, said neck having a terminal end with an open exit port remote from said outlet end, and said elongate tubular neck having a linear passageway which extends from said outlet end of said chamber to said terminal end with said open exit port, said flow head chamber having an interior wall means converging from said open inlet end to said outlet end, and said chamber being in flow communication with said elongate tubular neck such that in a vertically oriented configuration with said inlet end uppermost, said open exit port lowermost and said elongate tubular neck disposed downwardly, solids material housed in said device may flow freely under gravity from said chamber into said tubular neck and along the linear passageway of the elongate length of the neck towards said open exit port, and said chamber having a volume capacity for said solids material which permits the device to deliver at least twice the volume capacity of said elongate tubular neck through said neck, storing a sample of said solids material in said flow head chamber and elongate neck of said device, establishing a smooth flow of said solids material along said tubular neck from said chamber outlet to said open exit port, under gravity, with said device in said vertically oriented configuration, measuring the volume of material in the smooth flow exiting the open exit port in a known time, and determining the volume of flow of the solids material per unit time, as a measure of the flow rate of the solids material, under gravity in an elongate pipe.

10. A method according to claim 9, wherein said solids material introducing step comprises introducing a concrete comprising coarse and fine aggregate, binder and water.

11. A method according to claim 9, wherein the step of measuring the volume of material in the smooth flow exiting the elongated tube, in a known time comprises:

starting a timer when said smooth flow is established and collecting the material exiting the elongate tube in a bucket, and timing the flow into the bucket until the smooth flow ends to provide a flow time, and determining the volume of flow per unit time from the volume in the bucket and the flow time.

* * * * *

UNITED STATES PATENT AND TRADEMARK OFFICE
CERTIFICATE OF CORRECTION

PATENT NO. : 7,610,801 B2 Page 1 of 1
APPLICATION NO. : 11/059185
DATED : November 3, 2009
INVENTOR(S) : O'Hearn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twelfth Day of October, 2010

David J. Kappos
*Director of the United States Patent and Trademark Office*